United States Patent
Kumabe (10) Patent No.: US 10,924,192 B2
(45) Date of Patent: *Feb. 16, 2021

(54) VEHICULAR COMMUNICATION DEVICE

(71) Applicant: DENSO CORPORATION, Kariya (JP)

(72) Inventor: Seigou Kumabe, Kariya (JP)

(73) Assignee: DENSO CORPORATION, Kariya (JP)

( * ) Notice: Subject to any disclaimer, the term of this patent is extended or adjusted under 35 U.S.C. 154(b) by 767 days.

This patent is subject to a terminal disclaimer.

(21) Appl. No.: 15/545,856

(22) PCT Filed: Jan. 28, 2016

(86) PCT No.: PCT/JP2016/000435
§ 371 (c)(1),
(2) Date: Jul. 24, 2017

(87) PCT Pub. No.: WO2016/125467
PCT Pub. Date: Aug. 11, 2016

(65) Prior Publication Data
US 2018/0006739 A1 Jan. 4, 2018

(30) Foreign Application Priority Data
Feb. 3, 2015 (JP) .................... 2015-019511

(51) Int. Cl.
*H04B 17/18* (2015.01)
*H04W 84/10* (2009.01)
(Continued)

(52) U.S. Cl.
CPC .......... *H04B 17/18* (2015.01); *G06Q 20/341* (2013.01); *G07B 15/063* (2013.01); *H04B 17/17* (2015.01);
(Continued)

(58) Field of Classification Search
CPC ......... H04B 17/18; H04B 17/17; H04W 4/80; H04W 4/40; H04W 24/08; H04W 84/10;
(Continued)

(56) References Cited

U.S. PATENT DOCUMENTS

| 6,972,669 | B2 * | 12/2005 | Saito | B60G 17/0185 340/438 |
| 7,023,332 | B2 * | 4/2006 | Saito | B60G 17/0185 340/438 |

(Continued)

FOREIGN PATENT DOCUMENTS

JP 2007048302 A 2/2007

OTHER PUBLICATIONS

Business Wire, "Siemens VDO Selects Acoustic Technologies SoundClear Full-Duplex Software for Bluetooth Car Kits," 1, New York, Business Wire, Aug. 31, 2004.*

(Continued)

*Primary Examiner* — Nathan Erb
(74) *Attorney, Agent, or Firm* — Harness, Dickey & Pierce, P.L.C.

(57) ABSTRACT

A vehicular communication device is provided. The vehicular communication device includes a reception section that receives, from a periphery vehicle equipped with a narrow area communicator for performing vehicle interior communication, a communication performance index representing performance of the narrow area communicator, and a controller. The controller includes: a reference value setup section that successively sets a reference value of the communication performance index based on the communication performance indexes received from multiple the periphery vehicles; an acquisition section that acquires the communication performance index for a targeted narrow area communicator; and an anomaly determination section that deter- (Continued)

mines anomaly of the targeted narrow area communicator, based on comparison between the reference value set by the reference value setup section and the communication performance index acquired by the acquisition section for the targeted narrow area communicator.

8 Claims, 6 Drawing Sheets

(51) Int. Cl.

| | | |
|---|---|---|
| H04W 88/02 | (2009.01) | |
| H04W 4/40 | (2018.01) | |
| H04W 24/08 | (2009.01) | |
| H04B 17/17 | (2015.01) | |
| H04W 4/80 | (2018.01) | |
| G06Q 20/34 | (2012.01) | |
| G07B 15/06 | (2011.01) | |
| G08G 1/0967 | (2006.01) | |
| G08G 1/16 | (2006.01) | |

(52) U.S. Cl.
CPC ............... *H04W 4/40* (2018.02); *H04W 4/80* (2018.02); *H04W 24/08* (2013.01); *H04W 84/10* (2013.01); *H04W 88/02* (2013.01); *G06Q 2240/00* (2013.01); *G08G 1/096716* (2013.01); *G08G 1/096783* (2013.01); *G08G 1/096791* (2013.01); *G08G 1/162* (2013.01); *G08G 1/164* (2013.01)

(58) Field of Classification Search
CPC . H04W 88/02; G06Q 20/341; G06Q 2240/00; G07B 15/063; G08G 1/096716; G08G 1/096783; G08G 1/096791; G08G 1/162; G08G 1/164
See application file for complete search history.

(56) References Cited

U.S. PATENT DOCUMENTS

| | | | | |
|---|---|---|---|---|
| 7,509,131 | B2* | 3/2009 | Krumm | H04N 21/4126 455/456.1 |
| 7,596,636 | B2* | 9/2009 | Gormley | B60R 16/0231 710/15 |
| 7,843,327 | B1* | 11/2010 | DiMartino | G08B 13/1409 340/505 |
| 7,925,398 | B2* | 4/2011 | Wempen | G07C 5/0808 701/29.7 |
| 7,990,286 | B2* | 8/2011 | Shankwitz | G01C 21/26 340/988 |
| 8,018,334 | B1* | 9/2011 | DiMartino | G08B 13/1409 340/505 |
| 8,072,350 | B2* | 12/2011 | Luke | B60W 30/02 340/903 |
| 8,314,736 | B2* | 11/2012 | Moshfeghi | H04W 4/029 342/465 |
| 8,509,987 | B2* | 8/2013 | Resner | G07C 5/085 701/33.3 |
| 8,868,030 | B2* | 10/2014 | Sumcad | H04W 12/1201 455/405 |
| 9,043,073 | B2* | 5/2015 | Ricci | G06F 3/0488 701/29.4 |
| 9,107,166 | B2* | 8/2015 | Mach | H04W 52/0274 |
| 9,154,265 | B2* | 10/2015 | Chini | H04L 1/1832 |
| 9,173,187 | B2* | 10/2015 | Moshfeghi | H04W 4/029 |
| 9,198,206 | B2* | 11/2015 | Li | G07C 5/0808 |
| 9,258,133 | B2* | 2/2016 | Callahan | G06Q 20/1235 |
| 9,258,173 | B2* | 2/2016 | Yousefi | H04L 47/821 |
| 9,292,978 | B2* | 3/2016 | Hunt | G07C 5/008 |
| 9,305,461 | B2* | 4/2016 | Elzein | G08G 1/0965 |
| 9,361,737 | B2* | 6/2016 | Harter | B60W 40/09 |
| 9,445,442 | B2* | 9/2016 | Thanayankizil | H04W 4/80 |
| 9,467,825 | B2* | 10/2016 | Slay, Jr. | H04W 4/023 |
| 9,480,020 | B2* | 10/2016 | Yae | H04W 52/0251 |
| 9,495,870 | B2* | 11/2016 | Jana | G08G 1/096716 |
| 9,503,886 | B2* | 11/2016 | Bell | H04W 4/029 |
| 9,503,988 | B2* | 11/2016 | Mach | H04W 52/0258 |
| 9,623,876 | B1* | 4/2017 | Slusar | G09B 19/167 |
| 9,824,507 | B2* | 11/2017 | Chen | G07C 5/008 |
| 9,832,241 | B1* | 11/2017 | Hayward | G01S 19/51 |
| 9,851,963 | B2* | 12/2017 | Todoroki | H04W 8/24 |
| 10,002,467 | B2* | 6/2018 | Elzein | H04L 67/125 |
| 10,078,831 | B2* | 9/2018 | Li | G07B 15/063 |
| 10,083,549 | B2* | 9/2018 | Harter | B60W 40/09 |
| 10,117,055 | B2* | 10/2018 | Frusina | H04N 21/6137 |
| 10,147,252 | B2* | 12/2018 | Schindler | H04L 12/40 |
| 10,169,927 | B2* | 1/2019 | Lilly | G07C 5/0808 |
| 10,223,752 | B1* | 3/2019 | Binion | G06Q 40/08 |
| 10,229,587 | B2* | 3/2019 | Anschutz | G08G 1/0141 |
| 10,251,077 | B2* | 4/2019 | Knowles | H04H 20/12 |
| 10,257,661 | B2* | 4/2019 | Kumabe | G08G 1/096791 |
| 10,395,538 | B2* | 8/2019 | Kumabe | G08G 1/096791 |
| 10,410,447 | B2* | 9/2019 | Ellis | G07C 9/00309 |
| 10,414,407 | B1* | 9/2019 | Slusar | B60W 40/09 |
| 10,431,018 | B1* | 10/2019 | Fields | G06F 8/65 |
| 10,506,091 | B2* | 12/2019 | Tibbitts | H04W 4/029 |
| 10,529,148 | B2* | 1/2020 | Cattone | G06Q 30/0241 |
| 10,686,976 | B2* | 6/2020 | Nalepka | H04N 5/77 |
| 10,740,850 | B1* | 8/2020 | Slusar | G06Q 40/08 |
| 2002/0044049 | A1* | 4/2002 | Saito | G07C 5/008 340/438 |
| 2002/0109587 | A1* | 8/2002 | Attring | B60R 25/2009 340/426.1 |
| 2002/0197955 | A1* | 12/2002 | Witkowski | G06K 7/10386 455/41.1 |
| 2003/0005030 | A1* | 1/2003 | Sutton | H04L 29/06 709/200 |
| 2003/0046382 | A1* | 3/2003 | Nick | G05B 9/02 709/224 |
| 2003/0083060 | A1* | 5/2003 | Menendez | H04W 88/02 455/423 |
| 2003/0095038 | A1* | 5/2003 | Dix | G07C 5/085 340/425.5 |
| 2003/0143987 | A1* | 7/2003 | Davis | H04M 3/42229 455/417 |
| 2003/0231118 | A1* | 12/2003 | Kitson | H04Q 9/02 340/870.07 |
| 2004/0085198 | A1* | 5/2004 | Saito | B60G 17/0185 340/438 |
| 2004/0203379 | A1* | 10/2004 | Witkowski | H04L 12/66 455/41.2 |
| 2006/0020380 | A1* | 1/2006 | Saito | B60R 16/0234 701/31.4 |
| 2006/0046749 | A1* | 3/2006 | Pomerantz | H04W 64/00 455/457 |
| 2006/0142907 | A1* | 6/2006 | Cancilla | G01M 15/02 701/31.4 |
| 2006/0261933 | A1* | 11/2006 | Deniau | G07C 5/008 340/426.15 |
| 2008/0177436 | A1* | 7/2008 | Fortson | G05B 23/0221 701/31.4 |
| 2009/0042518 | A1* | 2/2009 | Ido | B60R 25/2018 455/90.2 |
| 2010/0205450 | A1* | 8/2010 | Sarnacke | B60R 25/00 713/185 |
| 2010/0222962 | A1* | 9/2010 | Haydn | H04M 1/6091 701/36 |
| 2010/0245067 | A1* | 9/2010 | Clauberg | H04W 52/0225 340/438 |
| 2012/0094657 | A1* | 4/2012 | Gullapalli | H04M 1/6091 455/425 |
| 2012/0194679 | A1* | 8/2012 | Nehowig | G06F 1/1626 348/148 |
| 2012/0197484 | A1* | 8/2012 | Nath | G08G 1/20 701/32.4 |
| 2012/0252364 | A1* | 10/2012 | Inabathuni | G08C 17/02 455/41.2 |

(56) References Cited

U.S. PATENT DOCUMENTS

| | | | | |
|---|---|---|---|---|
| 2012/0323770 | A1* | 12/2012 | Michael | G07C 5/008 705/39 |
| 2013/0046510 | A1* | 2/2013 | Bowne | G06Q 10/0639 702/187 |
| 2013/0137372 | A1* | 5/2013 | Nishidai | B60R 25/102 455/41.1 |
| 2013/0151671 | A1* | 6/2013 | Alvarez Rodriguez | H04L 67/00 709/219 |
| 2013/0163511 | A1* | 6/2013 | Waldner | H04W 4/70 370/328 |
| 2013/0204645 | A1* | 8/2013 | Lehman | G06Q 40/08 705/4 |
| 2013/0232218 | A2* | 9/2013 | Bell | H04W 24/08 709/217 |
| 2013/0238185 | A1* | 9/2013 | Cho | B60R 25/10 701/36 |
| 2013/0317668 | A1* | 11/2013 | Tarnutzer | G06F 13/38 701/2 |
| 2014/0043135 | A1* | 2/2014 | Kotecha | G05B 19/0428 340/3.1 |
| 2014/0066014 | A1* | 3/2014 | Nicholson | H04W 12/0808 455/411 |
| 2014/0067152 | A1* | 3/2014 | Swanson | H04W 4/00 701/1 |
| 2014/0125525 | A1* | 5/2014 | Kane | G08B 21/0247 342/450 |
| 2014/0149032 | A1* | 5/2014 | Barrett | G01C 21/32 701/409 |
| 2014/0200740 | A1* | 7/2014 | Lavi | G06F 17/00 701/2 |
| 2014/0229035 | A1* | 8/2014 | Rector | B60R 16/037 701/2 |
| 2014/0287733 | A1* | 9/2014 | Mach | H04W 52/0274 455/418 |
| 2014/0378060 | A1* | 12/2014 | Akama | H04W 4/80 455/41.2 |
| 2015/0046022 | A1* | 2/2015 | Bai | G07C 5/008 701/31.5 |
| 2015/0054647 | A1* | 2/2015 | Edwards | G08B 21/22 340/568.1 |
| 2015/0057875 | A1* | 2/2015 | McGinnis | G07C 5/0841 701/31.6 |
| 2015/0071334 | A1* | 3/2015 | Chini | H04W 4/80 375/219 |
| 2015/0072668 | A1* | 3/2015 | Macdonald | H04L 47/24 455/418 |
| 2015/0072670 | A1* | 3/2015 | Kelley | H04M 1/7253 455/418 |
| 2015/0073697 | A1* | 3/2015 | Barrett | G01S 19/426 701/409 |
| 2015/0133053 | A1* | 5/2015 | Li | H04W 76/10 455/41.2 |
| 2015/0143116 | A1* | 5/2015 | Tang | G06Q 20/401 713/168 |
| 2015/0149042 | A1* | 5/2015 | Cooper | B60R 16/037 701/48 |
| 2015/0154557 | A1* | 6/2015 | Skaaksrud | G05D 1/021 705/337 |
| 2015/0161584 | A1* | 6/2015 | Monk | G06Q 20/322 235/382 |
| 2015/0170427 | A1* | 6/2015 | Hansen | H04W 4/80 701/31.5 |
| 2015/0199855 | A1* | 7/2015 | Alam | G07C 5/008 701/31.5 |
| 2015/0201297 | A1* | 7/2015 | Sauerbrey | H04W 4/80 340/436 |
| 2015/0206358 | A1* | 7/2015 | Chen | G07C 5/008 701/29.6 |
| 2015/0212807 | A1* | 7/2015 | Elzein | H04L 67/34 717/173 |
| 2015/0215986 | A1* | 7/2015 | Lei | H04W 76/19 370/329 |
| 2015/0223012 | A1* | 8/2015 | Kakarala | G06Q 20/322 705/26.8 |
| 2015/0223273 | A1* | 8/2015 | Macdonald | G08C 17/02 370/252 |
| 2015/0227359 | A1* | 8/2015 | Todoroki | H04M 1/72525 717/169 |
| 2015/0239408 | A1* | 8/2015 | Barrett | H04W 4/046 701/1 |
| 2015/0254781 | A1* | 9/2015 | Binion | G07C 5/085 701/32.2 |
| 2015/0296441 | A1* | 10/2015 | Elnajjar | H04W 4/80 370/312 |
| 2015/0309859 | A1* | 10/2015 | Elzein | G06F 11/0766 714/49 |
| 2015/0327173 | A1* | 11/2015 | Yae | H04W 76/30 455/41.2 |
| 2015/0327305 | A1* | 11/2015 | Yae | H04W 4/80 455/41.2 |
| 2015/0327319 | A1* | 11/2015 | Yae | H04W 76/10 455/41.2 |
| 2016/0021486 | A1* | 1/2016 | Rencher | H04W 4/40 455/41.2 |
| 2016/0105775 | A1* | 4/2016 | Azmat | H04W 4/08 455/518 |
| 2016/0112216 | A1* | 4/2016 | Sargent | G07C 5/0808 370/328 |
| 2016/0150407 | A1* | 5/2016 | Michaud | H04W 4/021 726/6 |
| 2016/0150588 | A1* | 5/2016 | Yae | H04L 67/12 455/41.2 |
| 2016/0155326 | A1* | 6/2016 | Ricci | B60R 25/01 701/117 |
| 2016/0157049 | A1* | 6/2016 | Choi | H04W 4/80 455/41.2 |
| 2016/0161944 | A1* | 6/2016 | Leonard | G05D 1/0016 701/2 |
| 2016/0188396 | A1* | 6/2016 | Sonalker | G06F 11/0739 714/37 |
| 2016/0189115 | A1* | 6/2016 | Cattone | G06Q 30/0633 705/26.8 |
| 2016/0189440 | A1* | 6/2016 | Cattone | G07C 5/008 701/31.5 |
| 2016/0225198 | A1* | 8/2016 | Punjabi | G07C 5/008 |
| 2017/0018180 | A1* | 1/2017 | Hubbard | G08G 1/20 |
| 2017/0039784 | A1* | 2/2017 | Gelbart | G07C 5/0808 |
| 2017/0223607 | A1* | 8/2017 | Cho | H04W 48/16 |
| 2017/0243485 | A1* | 8/2017 | Rubin | G08G 1/052 |
| 2018/0365094 | A1* | 12/2018 | Sonalker | G06F 11/0739 |
| 2019/0250243 | A1* | 8/2019 | Jouaux | G06Q 10/047 |
| 2019/0289112 | A1* | 9/2019 | Ozaki | H04M 1/2757 |
| 2020/0045503 | A1* | 2/2020 | O'Malley | H04W 4/023 |
| 2020/0202642 | A1* | 6/2020 | Cattone | G07C 5/008 |

OTHER PUBLICATIONS

U.S. Appl. No. 15/545,829, filed Jul. 24, 2017, Kumabe.
U.S. Appl. No. 15/545,846, filed Jul. 24, 2017, Kumabe.

* cited by examiner

VEHICULAR COMMUNICATION DEVICE

CROSS REFERENCE TO RELATED APPLICATIONS

This application is a U.S. National Phase Application under 35 U.S.C. 371 of International Application No. PCT/JP2016/000435 filed on Jan. 28, 2016 and published in Japanese as WO 2016/125467 A1 on Aug. 11, 2016. This application is based on and claims the benefit of priority from Japanese Patent Application No. 2015-019511 filed on Feb. 3, 2015. The entire disclosures of all of the above applications are incorporated herein by reference.

TECHNICAL FIELD

The present disclosure relates to a vehicular communication device that determines anomaly of a narrow area communicator.

BACKGROUND ART

Conventionally, there is known a technology that detects anomaly occurring on a device used for vehicles. Patent Literature 1 discloses the technology that uses a shock sensor included in an in-vehicle device to detect anomaly occurring on the in-vehicle device, for example.

Further, there is known a system in which a vehicular communication device communicates with a communication device brought into the vehicle to enable a driver of the vehicle to use various services (hereinafter referred to as interior communication services). There is available a service, as an example, in which the vehicular communication device wirelessly connects with a portable such as a smartphone brought into the vehicle and allows the portable to display various types of information such as traffic information received from outside the vehicle.

There is also known a service that communicates with an IC card storing a credit card number or comparable payment information to pay charges, reads the payment information from the IC card at the toll station of a toll road, and transmits the payment information to a roadside device or a comparable communication device outside the vehicle. The in-vehicle device includes a narrow area communicator to provide these interior communication services.

PRIOR ART LITERATURES

Patent Literature

[Patent Literature 1] JP2007-48302A

SUMMARY OF INVENTION

The narrow area communicator performs wireless communication in accordance with the Bluetooth (registered trademark) standard or the NFC standard. A driver cannot receive the above-mentioned interior communication service if the narrow area communicator is abnormal. It is therefore necessary to determine anomaly of the narrow area communicator.

The narrow area communicator may be determined to malfunction when communication performance of the narrow area communicator degrades. However, the communication environment of the narrow area communicator dynamically changes because the vehicular communication device is used for a vehicle acting as a mobile object. A noise to interfere with communication of the narrow area communicator may be radiated to entire surroundings of the vehicle. It has been therefore difficult to accurately determine an anomaly on the narrow area communicator based only on the communication performance.

It is an object of the present disclosure to provide a vehicular communication device capable of accurately determining anomaly of a narrow area communicator in consideration of the foregoing.

A vehicular communication device in an aspect of the present disclosure is used for a vehicle and comprises: a reception section that receives, from a periphery vehicle equipped with a narrow area communicator for performing vehicle interior communication, a communication performance index representing performance of the narrow area communicator; a reference value setup section that successively sets a reference value as a criterion for the communication performance index, based on the communication performance indexes received by the reception section from a plurality of the periphery vehicles; an acquisition section that acquires the communication performance index for a targeted narrow area communicator, the targeted narrow area communicator being the narrow area communicator that is targeted at anomaly determination; and an anomaly determination section that determines anomaly of the targeted narrow area communicator, based on comparison between the reference value set by the reference value setup section and the communication performance index acquired by the acquisition section for the targeted narrow area communicator.

In the vehicular communication device, the reference value setup section sets a reference value based on communication performance indexes acquired from multiple periphery vehicles. The reference value therefore varies with an influence of the communication environment when the communication performance of a targeted narrow area communicator varies with the influence of the communication environment.

The anomaly determination on the targeted narrow area communicator is performed based on comparison between the reference value and the communication performance index for the targeted narrow area communicator. It becomes therefore possible to accurately distinguish the two cases from each other. One case is the case where the communication performance index for the targeted narrow area communicator is abnormal due to an anomaly of the targeted narrow area communicator. The other case is the case where the targeted narrow area communicator is not abnormal but the communication performance index for the targeted narrow area communicator is abnormal due to the influence of the communication environment. It is therefore possible to accurately determine whether the targeted narrow area communicator is abnormal.

BRIEF DESCRIPTION OF DRAWINGS

The foregoing and other objects, features and advantages of the present disclosure will become more apparent from the detailed description of the preferred embodiments of the present disclosure given below with reference to the accompanying drawings in which.

EMBODIMENTS FOR CARRYING OUT INVENTION (Overall Configuration of a Communication System 1)

Figure 1:
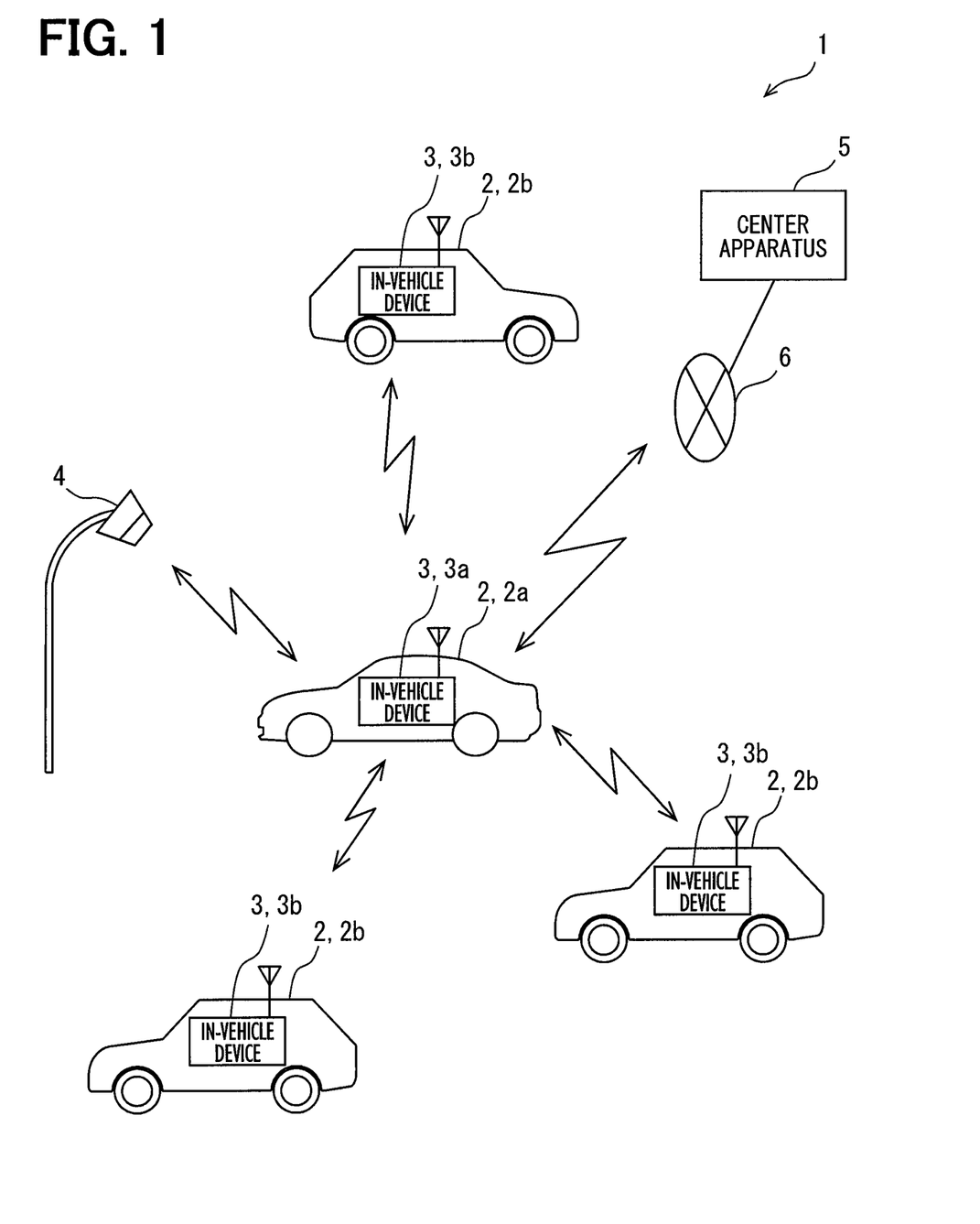
FIG. 1 is a diagram illustrating an overall configuration of a communication system according to an embodiment.

An embodiment will be described with reference to the accompanying drawings. A communication system 1 as illustrated in FIG. 1 includes: an in-vehicle device 3a used for a subject vehicle 2a; an in-vehicle device 3b used for a periphery vehicle 2b located in the vicinity of the subject vehicle 2a; a roadside device 4 installed at a roadside; and a center apparatus (hereinafter referred to as a center) 5.

The in-vehicle device 3a and the in-vehicle device 3b use the same configuration according to the embodiment. The distinction between subject vehicle 2a and the periphery vehicle 2b is therefore for convenience sake. Any of the vehicles 2 can be the subject vehicle 2a. The periphery vehicle 2b is assumed to be the vehicle 2 that exists in the vicinity of the subject vehicle 2a and uses the in-vehicle device 3. In the description below, the nomenclature of vehicle 2 is simply used when the subject vehicle 2a and the periphery vehicle 2b are not distinguished. The nomenclature of in-vehicle device 3 is simply used when the in-vehicle device 3a and the in-vehicle device 3b are not distinguished. The in-vehicle device 3 corresponds to a vehicular communication device.

The in-vehicle device 3a and the in-vehicle device 3b transmit and receive information by using inter-vehicle communication, namely, wireless communication without using a communication network. The inter-vehicle communication covers a communication range of several hundreds of meters. The in-vehicle device 3 and the roadside device 4 transmit and receive information by using vehicle roadside communication, namely, wireless communication without using a communication network. The in-vehicle device 3 and the center 5 perform wide area communication via a wide area communication network 6.

The roadside device 4 performs the vehicle roadside communication with the in-vehicle device 3 to exchange information about service provision when the in-vehicle device 3 is used for the vehicle 2 that is located in a wireless communication area for the roadside device 4. The wireless communication area for the roadside device 4 can be variously changed depending on service types. The wireless communication area approximates to several tens to hundreds of meters from the roadside device 4, for example.

The center 5 is provided as a server and receives a notification that is transmitted from the in-vehicle device 3 by using the wide area communication. The notification includes anomaly notifications from a Bluetooth communicator 34 and an NFC communicator 35 (see FIG. 2) included in the in-vehicle device 3. Bluetooth is a registered trademark.

(Configuration of the In-Vehicle Device 3)

The configuration of the in-vehicle device 3 will be described. The description below about FIGS. 2 through 6 explains the configuration of the in-vehicle device 3a mounted on the subject vehicle 2a. As above, however, the same configuration is used for the in-vehicle device 3a mounted on the subject vehicle 2a and the in-vehicle device 3b mounted on the periphery vehicle 2b.

The in-vehicle device 3a may be fixed to a member included in the subject vehicle 2a by using a bolt or an adhesive so that the in-vehicle device 3a can hardly be brought out of the subject vehicle 2a. Alternatively, the in-vehicle device 3a may be fixed to a holder so that the in-vehicle device 3a can be detached from the holder without using a tool. The in-vehicle device 3a is assumed to be normally mounted on the subject vehicle 2a at a dashboard facing a windshield.

Figure 2:
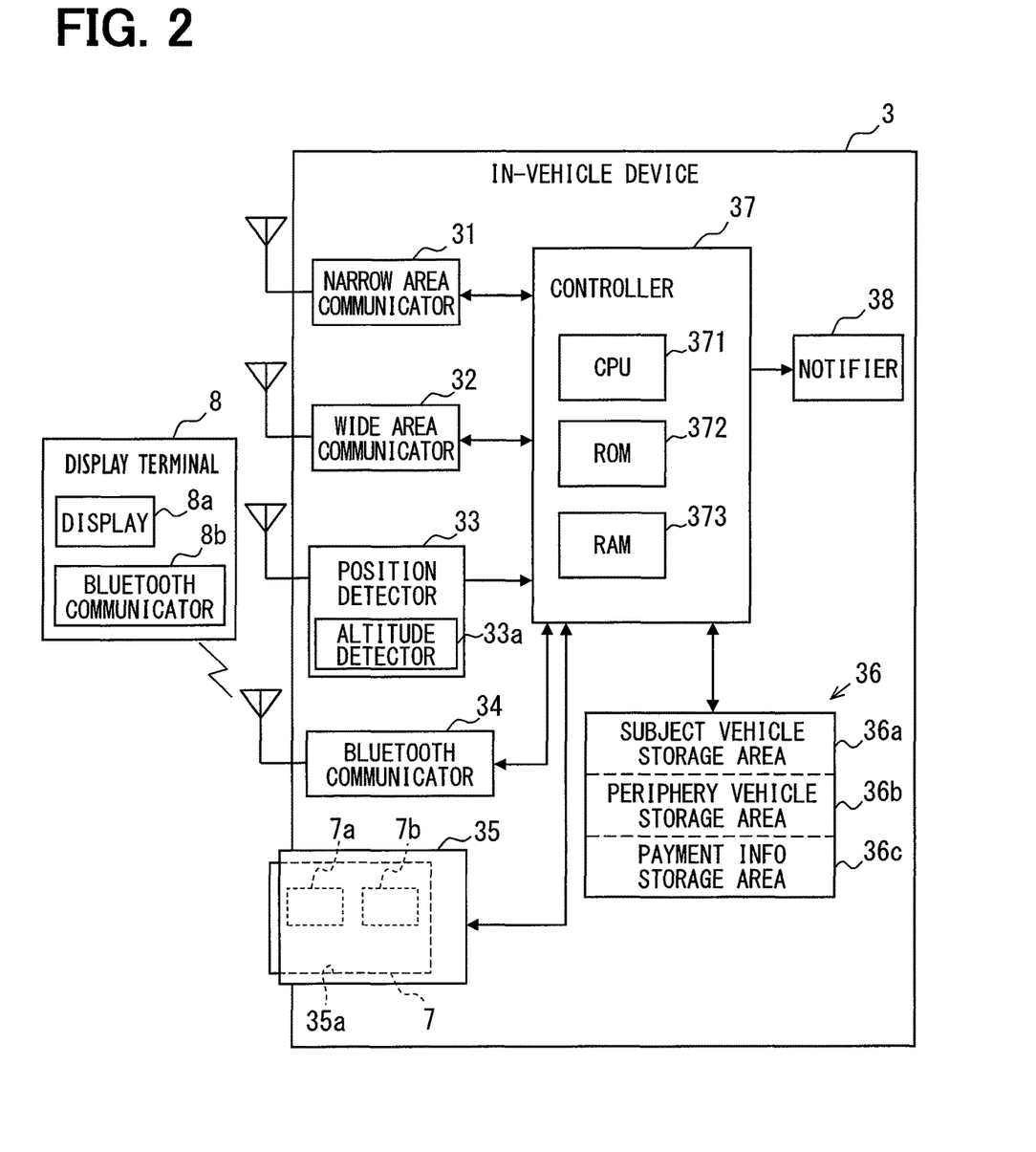
FIG. 2 is a block diagram illustrating a configuration of an in-vehicle device in FIG. 1.

As illustrated in FIG. 2, the in-vehicle device 3 includes a narrow area communicator 31, a wide area communicator 32, a position detector 33, a Bluetooth communicator 34, an NFC communicator 35, a storage unit 36, a controller 37, and a notifier 38. The Bluetooth communicator 34 and the NFC communicator 35 each provide a narrow area communicator.

The narrow area communicator 31 can be also referred to as an inter-vehicle communicator or a vehicle roadside communicator and communicates with the outside of the subject vehicle 2a by using inter-vehicle communication and vehicle roadside communication. The narrow area communicator 31 covers a communication range comparable to a radius of approximately several hundreds of meters. The narrow area communicator 31 communicates with the in-vehicle device 3b mounted on the periphery vehicle 2b and with the roadside device 4. The narrow area communicator 31 serves as a receiver to receive communication performance indexes for the Bluetooth communicator 34 and the NFC communicator 35 included in the in-vehicle device 3b from the in-vehicle device 3b of the periphery vehicle 2b.

The vicinity according to the embodiment signifies the communication range of the narrow area communicator 31. The narrow area communicator 31 modulates and demodulates a received signal and outputs demodulated data to the controller 37. The narrow area communicator 31 modulates data input from the controller 37, converts the data into an electromagnetic wave, and transmits it.

The wide area communicator 32 connects with the wide area communication network 6 to communicate with the center 5 outside the subject vehicle 2a, for example. The wide area communicator 32 demodulates a signal received via the wide area communication network 6 and outputs the signal to the controller 37. The wide area communicator 32 modulates a baseband signal input from the controller 37 and transmits the signal to the center 5.

The position detector 33 includes a GNSS receiver used for GNSS (Global Navigation Satellite System) and successively detects a current position of the subject vehicle 2a based on a positioning signal received from a positioning satellite. The current position is represented in latitude, longitude, and altitude. The position detector 33 detects the altitude and therefore also provides a function as an altitude detector 33a. The position detector 33 successively (e.g., every 100 milliseconds) outputs the detected current position to the controller 37.

The Bluetooth communicator 34 is compliant with the Bluetooth communication standard. The Bluetooth communicator 34 therefore features a communication frequency of 2.4 GHz band and a communication distance of several to several tens of meters. The Bluetooth communicator 34 performs vehicle interior communication with a display terminal 8 brought into a vehicle compartment of the subject vehicle 2a.

The controller 37 may supply information to be displayed on a display 8a included in the display terminal 8. In this case, the Bluetooth communicator 34 modulates the information and transmits it to the Bluetooth communicator 8b.

The Bluetooth communicator 34 receives various information transmitted from the Bluetooth communicator 8b while the Bluetooth communicator 34 is connected to the Bluetooth communicator 8b included in the display terminal 8. The display terminal 8 is available as a smartphone, for example.

While communicating with the Bluetooth communicator 8b, the Bluetooth communicator 34 determines any one of an RSSI (Received Signal Strength Indication), an average communication rate, a communication success rate, and the number of received error frames as a BT communication performance index. The BT communication performance index is predetermined to represent which of these. The BT communication performance index represents the same one for the different in-vehicle devices 3.

The RSSI is determined based on the electric power of a received electromagnetic wave. The average communication rate is determined based on the quantity of data received during a specified time. The communication success rate is calculated from the number of frames received during a specified time and the number of successfully decoded frames. The number of received error frames provides the number of frames resulting in errors during a specified time, namely, the number of unsuccessfully decoded frames.

The Bluetooth communicator 34 determines the BT communication performance index at a specified time interval or in units of specified communication traffic. The Bluetooth communicator 34 outputs the determined BT communication performance index to the controller 37.

The NFC communicator 35 is compliant with the NFC communication standard. The NFC communicator 35 therefore features a communication frequency of 13.56 MHz and a communication distance of approximately 10 cm. The NFC communicator 35 includes a card slot 35a and performs wireless communication with a card-type wireless tag 7 inserted into the card slot 35a.

The card-type wireless tag 7 includes a storage unit 7a and a communicator 7b. The storage unit 7a as a storage medium stores payment information. The payment information here is assumed to be a card number. The center 5 also stores the card number. The card-type wireless tag 7 includes one of a credit card function and a prepaid card function. Suppose the center 5 is notified of the card number as well as a charge. The center 5 then performs a process to withdraw the charge from an account corresponding to the card number when the card-type wireless tag 7 corresponds to the credit card type. The center 5 performs a process to subtract the charge from the balance corresponding to the card number when the card-type wireless tag 7 corresponds to the prepaid card type.

While communicating with the card-type wireless tag 7, the NFC communicator 35 determines one of the RSSI, the average communication rate, the communication success rate, and the number of received error frames as an NFC communication performance index. The NFC communication performance index is predetermined to represent which of these. The NFC communication performance index represents the same one for the different in-vehicle devices 3. The NFC communicator 35 outputs the determined NFC communication performance index to the controller 37.

The NFC communicator 35 determines the NFC communication performance index during communication at every completion of the communication with the card-type wireless tag 7 or in units of specified communication traffic. The NFC communicator 35 outputs the determined NFC communication performance index to the controller 37.

The storage unit 36 is rewritable and includes a subject vehicle storage area 36a, a periphery vehicle storage area 36b, and a payment information storage area 36c.

The subject vehicle storage area 36a stores the BT communication performance index supplied from the Bluetooth communicator 34 to the controller 37 and the NFC communication performance index supplied from the NFC communicator 35. The periphery vehicle storage area 36b stores the BT communication performance index and the NFC communication performance index received from the periphery vehicle 2b. The payment information storage area 36c stores a card number the NFC communicator 35 reads from the card-type wireless tag 7.

The controller 37 is provided as a typical computer including a CPU 371, ROM 372, and RAM 373. The ROM 372 stores a control program. The CPU 371 executes the control program stored in the ROM 372 by using a temporary storage function of the RAM 373. The controller 37 thereby performs processes illustrated in FIGS. 3 through 6.

The controller 37 stores the BT communication performance index supplied from the NFC communicator 35 and the NFC communication performance index supplied from the NFC communicator 35 as well as time points of storing in the subject vehicle storage area 36a of the storage unit 36. The controller 37 deletes a BT communication performance index and an NFC communication performance index expiring a predetermined retention time from BT communication performance indexes and NFC communication performance indexes stored in the subject vehicle storage area 36a of the storage unit 36. The retention time is short enough to be highly likely to cause an acceptable change in the BT communication performance index or the NFC communication performance index due to a change in the communication environment while the subject vehicle 2a is traveling. The retention time is predetermined based on experiments. All or part of the functions performed by the controller 37 may be configured as hardware by using one or more IC modules.

The notifier 38 is available as either or both of a display and a speaker and is used to notify an occupant of the subject vehicle 2a that the NFC communicator 35 is abnormal.

(Processes of the Controller 37)

The controller 37, when powered on, performs processes illustrated in FIGS. 3 through 6 each at a corresponding predetermined cycle. The description below first explains an information transmission process in FIG. 3.

At step S1, it is determined whether an information transmission cycle is reached. The information transmission cycle ranges from one to several hundreds of milliseconds. The process in FIG. 3 terminates if the determination at step S1 results in NO. The process proceeds to step S2 if the determination results in YES.

Figure 3:
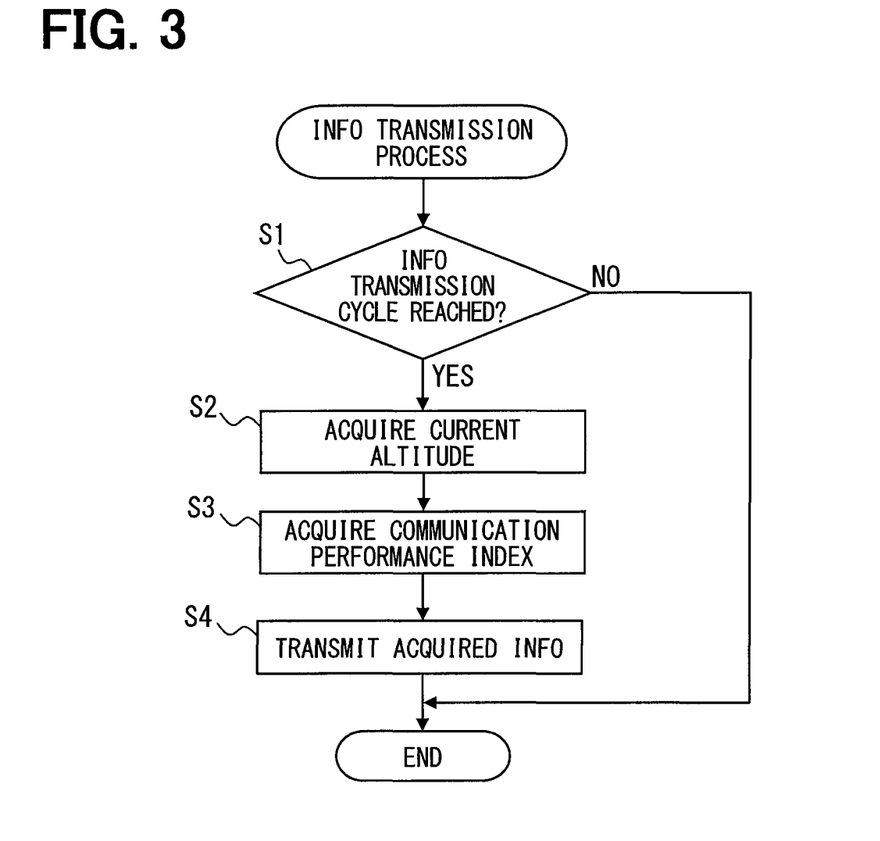
FIG. 3 is a flowchart illustrating an information transmission process performed by a controller in FIG. 2.

At step S2, a current altitude is acquired from the position detector 33. The current altitude is included in the current position. Current latitude and longitude may be acquired in addition to the current altitude.

At step S3, the most recent BT communication performance index and the most recent NFC communication performance index concerning the subject vehicle 2a are acquired from the subject vehicle storage area 36a of the storage unit 36.

At step S4, the narrow area communicator 31 transmits, to the surrounding of the subject vehicle 2a, the current altitude acquired at step S2 and the BT communication performance index and the NFC communication performance index acquired at step S3 along with a vehicle ID of the subject vehicle 2a. The vehicle ID of the subject vehicle 2a is stored in a specified storage unit such as the ROM 372. An ID of the in-vehicle device 3a can be used as the vehicle ID of the subject vehicle 2a. The narrow area communicator 31 uses a broadcast system as a transmission system, for example. However, the transmission system may use a unicast or multicast system that specifies the periphery vehicle 2b as an information transmission destination.

Figure 4:
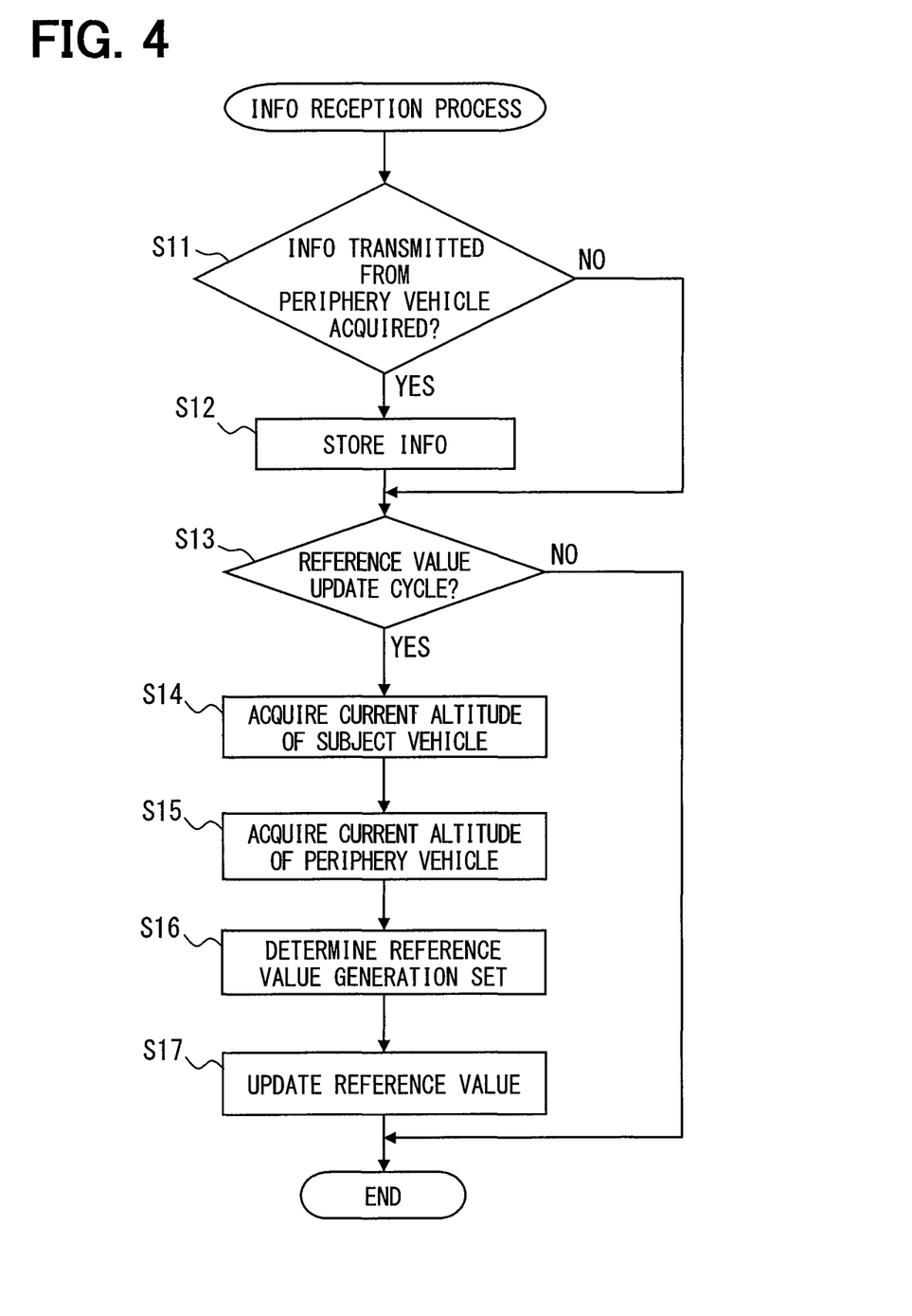
FIG. 4 is a flowchart illustrating an information reception process performed by the controller in FIG. 2.

The description below explains an information reception process illustrated in FIG. 4. At step S11, it is determined whether information is transmitted from the in-vehicle device 3b mounted on the periphery vehicle 2b. Specifically, the periphery vehicle 2b performs step S4 in FIG. 3 as above and the narrow area communicator 31 of the in-vehicle device 3a receives the information. The narrow area communicator 31 then supplies the decoded data as above. At step S11, it is determined whether the decoded data is supplied from the narrow area communicator 31. The process directly proceeds to step S13 if the determination results in NO. The process proceeds to step S12 if the determination results in YES.

At step S12, the information acquired from the narrow area communicator 31 is stored in the periphery vehicle storage area 36b of the storage unit 36 along with the time point of storing. The most recent information acquired from the narrow area communicator 31 is stored and information whose retention time expires is deleted.

The periphery vehicle 2b transmits the same type of information as that transmitted by the subject vehicle 2a at step S4 in FIG. 3. The information transmitted by the periphery vehicle 2b therefore includes the current altitude of the periphery vehicle 2b, the BT communication performance index for the Bluetooth communicator 34 and the NFC communication performance index for the NFC communicator 35 included in the in-vehicle device 3b of the periphery vehicle 2b, and the vehicle ID of the periphery vehicle 2b.

Steps S13 through S17 are the process corresponding to a reference value setup section. At step S13, it is determined whether a reference value update cycle is reached. The reference value update cycle is predetermined and takes effect longer than or equal to the information transmission cycle. The process in FIG. 4 terminates if the determination results in NO. The process proceeds to step S14 if the determination results in YES.

At step S14, the current altitude is acquired from the position detector 33. At step S15, the current altitude of each periphery vehicle 2b stored in the periphery vehicle storage area 36b of the storage unit 36 is acquired.

At step S16, an altitude difference between the altitude acquired at step S15 and the current altitude of the subject vehicle 2a acquired at step S14 is calculated for each periphery vehicle 2b. When the altitude difference is within a predetermined approximate altitude range, a reference value generation set includes the BT communication performance index and the NFC communication performance index for the periphery vehicle 2b corresponding to the altitude used in the calculation of the altitude difference. The approximate altitude range is set taking in considering that when the heights of the vehicles 2 do not match, there may be different levels of noise affecting on the communications using the Bluetooth communicators 34 and the NFC communicators 35. The approximate altitude range can be set to any numeric value. The approximate altitude range is configured so that a reference altitude range does not cover the height of the periphery vehicle 2b traveling an elevated highway when the subject vehicle 2a is traveling on the ground, for example.

Using only the periphery vehicle 2b indicating an altitude difference within the approximate altitude range, there may be cases where the number of communication performance indexes included in the reference value generation set is smaller than a minimum number of communication performance indexes that ensures the reliability of reference values. In such a case, the reference value generation set includes all communication performance indexes stored in the periphery vehicle storage area 36b. In this context, the minimum number is 2 or larger. Specifically, any numeric values are available. The reference value generation set may include the BT communication performance index and the NFC communication performance index for the subject vehicle 2a.

At step S17, the reference value for the BT communication performance indexes is updated by using the BT communication performance index included in the reference value generation set determined at step S16. The reference value for the NFC communication performance indexes is updated by using the NFC communication performance index included in the reference value generation set determined at step S16.

No reference value is specified when the in-vehicle device 3a is powered. Thus, step S17 is performed for the first time after the power on of the in-vehicle device 3a, the reference value is specified, not updated.

A specific reference value generated from the reference value generation set uses any one of an average value, a median value, and a mode value for communication performance indexes included in the reference value generation set. The reference value is used to determine an anomaly in the Bluetooth communicator 34 and the NFC communicator 35 during an anomaly determination process to be described next.

Figure 5:
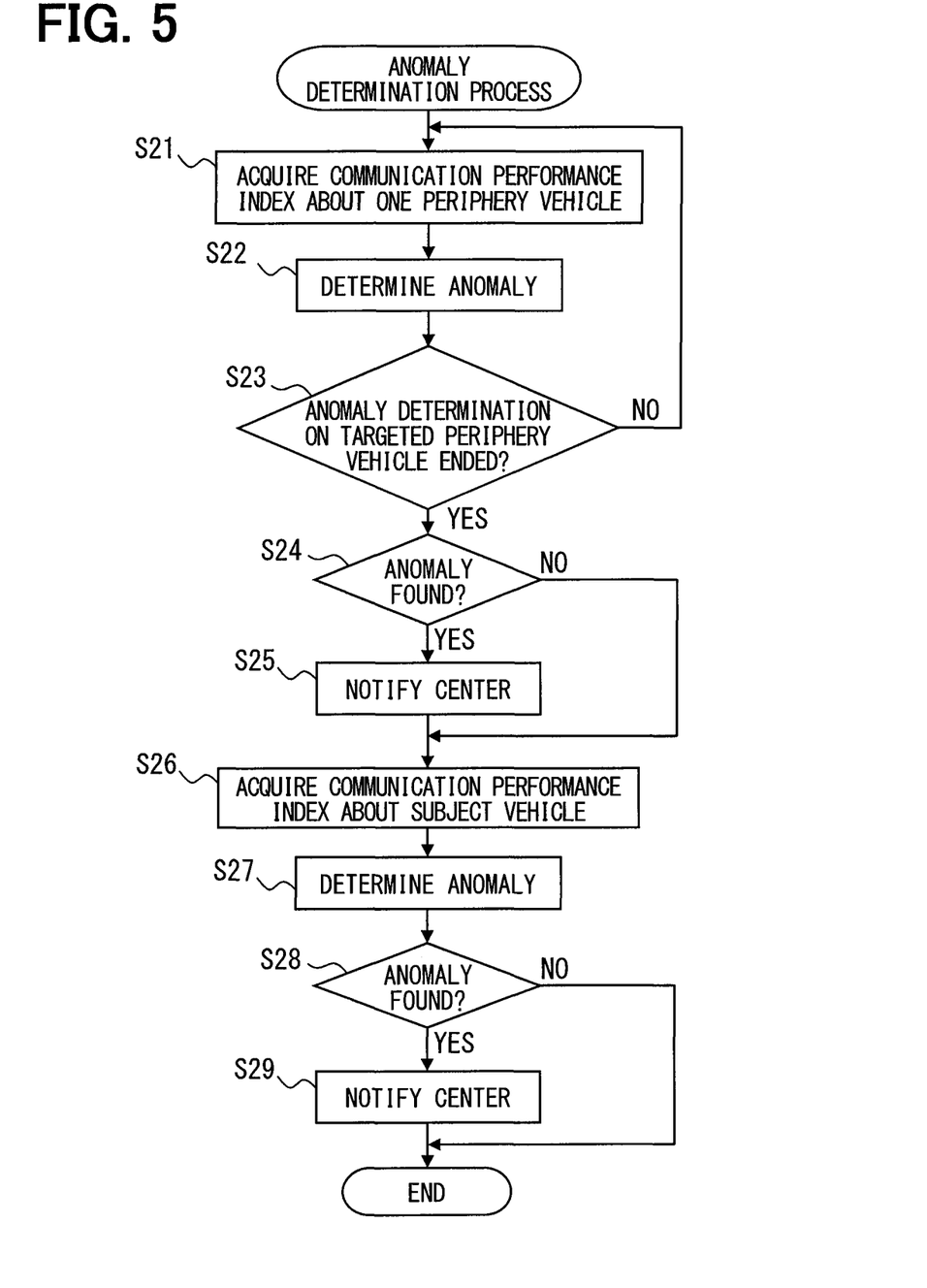
FIG. 5 is a flowchart illustrating an anomaly determination process performed by the controller in FIG. 2.

The description below explains an anomaly determination process illustrated in FIG. 5. At step S21 corresponding to an acquisition section, the most recent BT communication performance index and NFC communication performance index corresponding to the Bluetooth communicator 34 and the NFC communicator 35 of the periphery vehicle 2b targeted at the anomaly determination are acquired from the periphery vehicle storage area 36b.

The Bluetooth communicator 34 or the NFC communicator 35 of the periphery vehicle 2b targeted at the anomaly determination to be performed corresponds to a targeted narrow area communicator. The Bluetooth communicator 34 or the NFC communicator 35 of the periphery vehicle 2b targeted at the anomaly determination to be performed corresponds to at least one of the Bluetooth communicators 34 or the NFC communicators 35 whose communication performance indexes are included in the reference value generation set. The Bluetooth communicators 34 and the NFC communicators 35 whose communication performance indexes are included in the reference value generation set are all assumed to be targeted narrow area communicators here.

At step S22 corresponding to an anomaly determination section, the BT communication performance index acquired at step S21 is compared with the reference value for the BT communication performance indexes and it is determined whether the Bluetooth communicator 34 corresponding to the BT communication performance index is abnormal.

It is determined that the Bluetooth communicator 34 of the periphery vehicle 2b having transmitted the communication performance index is abnormal when an anomaly determination condition is satisfied as a result of the comparison between the BT communication performance index with the reference value. The anomaly determination condition specifies that a difference between the reference value and the BT communication performance index is larger than an anomaly determination threshold value settled for the difference, for example. The anomaly determination condition may specify that a ratio between the reference value and the BT communication performance index exceeds an anomaly determination range settled for the ratio.

At step S22, the NFC communication performance index acquired at step S21 is compared with the reference value for the NFC communication performance indexes and it is determined whether the NFC communicator 35 corresponding to the communication performance index acquired at step S21 is abnormal.

It is determined that the NFC communicator 35 of the periphery vehicle 2b having transmitted the communication performance index is abnormal when the anomaly determination condition is satisfied as a result of the comparison between the NFC communication performance index with the reference value. The anomaly determination condition specifies that a difference between the reference value and the NFC communication performance index is larger than the anomaly determination threshold value. The anomaly determination condition may specify that a ratio between the reference value and the NFC communication performance index exceeds the anomaly determination range.

At step S23, it is determined whether to end the anomaly determination on the Bluetooth communicator 34 and the NFC communicator 35 of the targeted periphery vehicle 2b. The process returns to step S21 if the determination results in NO. At step S21 in this case, the most recent communication performance index for the Bluetooth communicator 34 or the NFC communicator 35 of the periphery vehicle 2b on which the anomaly determination is not performed yet is acquired. The communication performance index is acquired from the periphery vehicle storage area 36b of the storage unit 36.

The process proceeds to step S24 if the determination at step S23 results in YES. At step S24, it is determined whether the Bluetooth communicator 34 or the NFC communicator 35 determined to be abnormal is found while steps S21 through S23 are repeated. The process proceeds to step S26 if the determination results in NO. The process proceeds to step S25 if the determination results in YES.

At S25 corresponding to a first anomaly notification processing section, the wide area communicator 32 notifies the center 5 of a message signifying that the Bluetooth communicator 34 or the NFC communicator 35 determined to be abnormal is abnormal. Repeated notification is unneeded if the same contents are already notified to the center 5. The notification also includes the vehicle ID of the periphery vehicle 2b mounted with the Bluetooth communicator 34 or the NFC communicator 35 determined to be abnormal. The wide area communicator 32 corresponds to a predetermined communicator.

At step S26 corresponding to the acquisition section, the targeted narrow area communicator is identified with the Bluetooth communicator 34 or the NFC communicator 35 of the subject vehicle 2a. The most recent BT communication performance index or NFC communication performance index corresponding to the Bluetooth communicator 34 or the NFC communicator 35 of the subject vehicle 2a is acquired from the subject vehicle storage area 36a of the storage unit 36.

At step S27 corresponding to the anomaly determination section, the BT communication performance index acquired at step S26 is compared with the reference value for the BT communication performance indexes and it is determined whether the Bluetooth communicator 34 of the subject vehicle 2a is abnormal. The NFC communication performance index acquired at step S26 is also compared with the reference value for the NFC communication performance indexes and it is determined whether the Bluetooth communicator 35 of the subject vehicle 2a is abnormal. The anomaly determination uses the same method as step S22.

At step S28, it is determined whether at least one of the Bluetooth communicator 34 and the NFC communicator 35 of the subject vehicle 2a is determined to be abnormal as a result of the anomaly determination at step S27. The process in FIG. 5 terminates if the determination results in NO. The process proceeds to step S29 if the determination results in YES.

At step S29 corresponding to a second anomaly notification processing section, the wide area communicator 32 notifies the center 5 of the vehicle ID of the subject vehicle 2a along with a message signifying that the communicator determined to be abnormal, namely, one of the Bluetooth communicator 34 and the NFC communicator 35, is abnormal. Repeated notification is unneeded if the same contents are already notified to the center 5.

The description below explains a payment process illustrated in FIG. 6. At step S31, it is determined whether charging information is acquired. The charging information includes a request for charge. The charging information is transmitted from outside the vehicle and is received by the narrow area communicator 31.

The roadside device 4 is provided as an apparatus that exists outside the vehicle and transmits the charging information, for example. Suppose the roadside device 4 is installed at an entry or an exit of a toll road. In such a case, the roadside device 4 transmits the charging information, namely, the information needed to charge a toll for the toll road. The roadside device 4 may be installed at a doorway of a pay parking lot.

The narrow area communicator 31 outputs the charging information, when received, to the controller 37. At step S31, it is therefore determined whether the charging information is acquired from the narrow area communicator 31.

Figure 6:
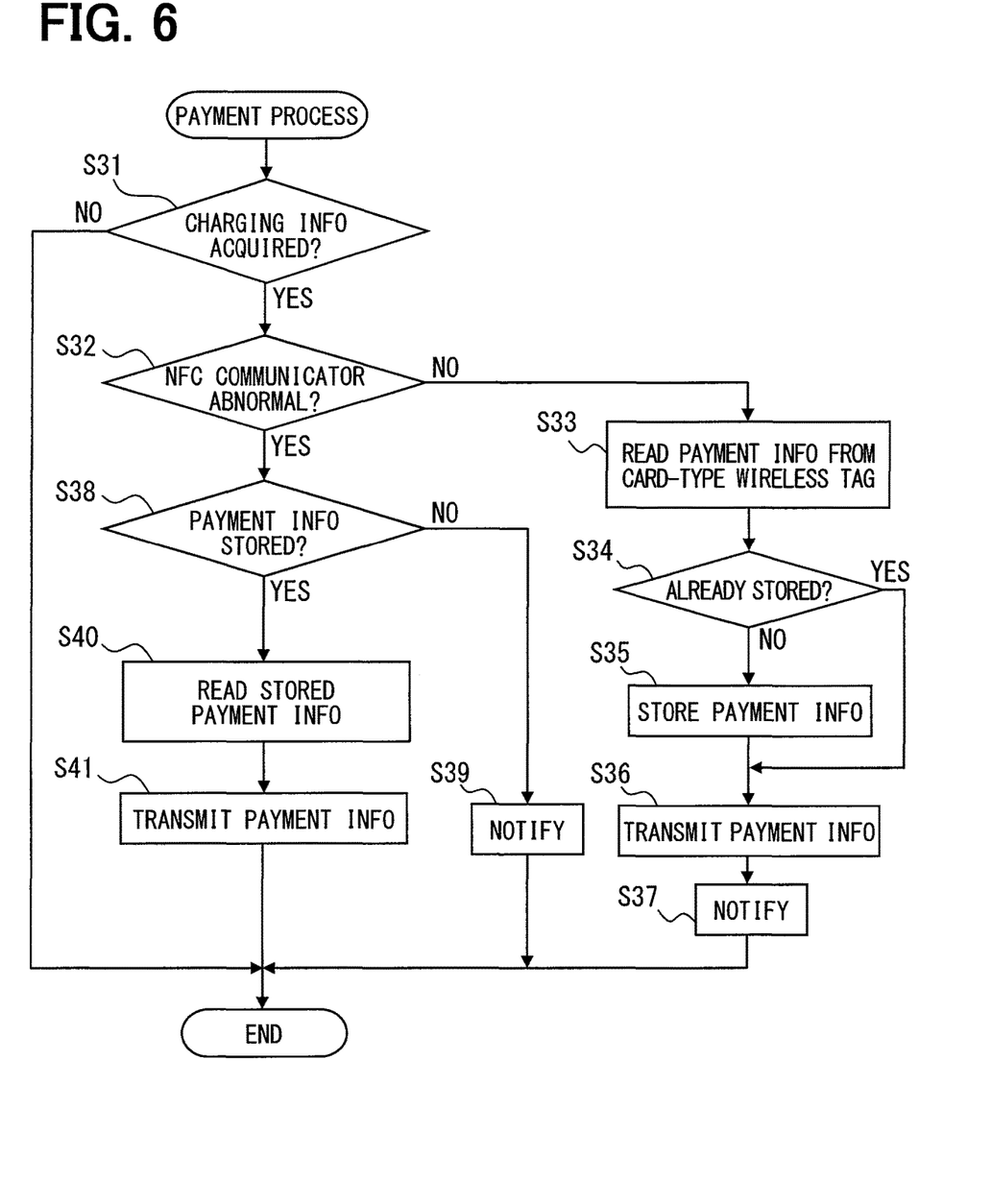
FIG. 6 is a flowchart illustrating a payment process performed by the controller in FIG. 2.

The process in FIG. 6 terminates if the determination at step S31 results in NO. The process proceeds to step S32 if the determination results in YES. At step S32, it is determined whether the NFC communicator 35 of the subject vehicle 2a is abnormal. The determination at step S32 results in YES when the NFC communicator 35 of the subject vehicle 2a is determined to be abnormal at step S27 in FIG. 5 while the power supply for the in-vehicle device 3a continues to be turned on.

Turning on an ignition switch also turns on the power supply for the in-vehicle device 3a. The duration of continuing the on-state of the power supply for the in-vehicle device 3a therefore signifies a state in which the ignition switch after the turn subsequently is kept at the on-state without being turned off.

The determination at step S32 results in NO if the NFC communicator 35 of the subject vehicle 2a is never determined to be abnormal at step S27 while the power supply for the in-vehicle device 3a is kept at the on-state. The process proceeds to step S33 if the determination at step S32 results in NO.

The process at steps S33 through S35 corresponds to a storage control section. At step S33, the NFC communicator 35 reads the payment information, namely, a card number from the card-type wireless tag 7 to acquire the card number.

At step S34, it is determined whether the storing of the acquired card number in the payment information storage area 36c of storage unit 36 is already made during the continued on-state of the power supply for the in-vehicle device 3a. The process proceeds to step S36 without performing step S35 if the determination results in YES. The process proceeds to step S35 if the determination results in NO.

At step S35, the card number read at step S33 is stored in the payment information storage area 36c of the storage unit 36.

At step S36 corresponding to a transmission control section, the wide area communicator 32 transmits the card number read at step S33 to the center 5.

At step S37, the notifier 38 notifies that the NFC communicator 35 of the subject vehicle 2a is abnormal.

The process proceeds to step S38 if the determination at step S32 results in YES. At step S38, it is determined whether the payment information is stored in the payment information storage area 36c of the storage unit 36.

The process proceeds to step S39 if the determination results in NO. At step S39, the notifier 38 notifies that the NFC communicator 35 is abnormal and cannot transmit the payment information.

The process proceeds to step S40 if the determination at step S38 results in YES. At step S40, the card number is read from the payment information storage area 36c of the storage unit 36. At step S41, the card number read at step S40 is transmitted.

Embodiment Overview

In the configuration of the embodiment, the reference value generation set includes a communication performance index acquired from the periphery vehicle 2b existing in the communication range for the narrow area communicator 31 of the subject vehicle 2a (S16). A reference value is determined from multiple communication performance indexes included in the reference value generation set (S17).

The communication environment of the Bluetooth communicator 34 and the communication environment of the NFC communicator 35 dynamically change because the in-vehicle device 3 is used for the vehicle 2 serving as a mobile object. In the regard, communication environments for multiple periphery vehicles 2b are similar to each other. Thus, when the communication performance of the Bluetooth communicator 34 or the NFC communicator 35 is changed because of the influence of the communication environment, the influence of the communication environment also changes the reference value determined based on communication performance indexes acquired from multiple periphery vehicles 2b. Additionally, even if the Bluetooth communicator 34 or the NFC communicator 35 is abnormal, the anomaly exercises little influence on the reference value because multiple communication performance indexes are used. The reference value can be therefore regarded as varying with the communication environment.

The reference value is compared with communication performance indexes for the Bluetooth communicator 34 and the NFC communicator 35 of the periphery vehicle 2b to determine an anomaly in the Bluetooth communicator 34 and the NFC communicator 35 of the periphery vehicle 2b (S22). Therefore, when the communication performance index for the Bluetooth communicator 34 of the periphery vehicle 2b indicates an abnormal value due to an anomaly of the Bluetooth communicator 34, the difference between the reference value and the communication performance index is large. Additionally, when the communication performance index for the NFC communicator 35 of the periphery vehicle 2b indicates an abnormal value due to an anomaly of the NFC communicator 35, the difference between the reference value and the communication performance index is large.

When the Bluetooth communicator 34 or the NFC communicator 35 of the periphery vehicle 2b is not abnormal but the communication performance index for the Bluetooth communicator 34 or the NFC communicator 35 indicates an abnormal value due to an influence of the communication environment, the difference between the reference value and the communication performance index is not large.

It is possible to accurately distinguish between the case where the Bluetooth communicator 34 or the NFC communicator 35 of the periphery vehicle 2b is abnormal and the case where the communication performance index for the Bluetooth communicator 34 or the NFC communicator 35 exhibits n abnormal value due to an influence of the communication environment. It is therefore possible to accurately determine anomaly of the Bluetooth communicator 34 or the NFC communicator 35 of the periphery vehicle 2b.

The reference value is also used to determine anomaly of the Bluetooth communicator 34 or the NFC communicator 35 of the subject vehicle 2a. Anomaly on the Bluetooth communicator 34 or the NFC communicator 35 of the subject vehicle 2a is determined by comparing the reference value with the communication performance index for the Bluetooth communicator 34 or the NFC communicator 35 of the subject vehicle 2a (S27). It is possible to accurately distinguish between the case where the Bluetooth communicator 34 or the NFC communicator 35 of the subject vehicle 2a is abnormal and the case where the communication performance index for the Bluetooth communicator 34 or the NFC communicator 35 exhibits an abnormal value due to an influence of the communication environment, for the same reason as the above-mentioned anomaly determination on the Bluetooth communicator 34 and the NFC communicator 35 of the subject vehicle 2a. It is therefore possible to accurately determine anomaly of the Bluetooth communicator 34 or the NFC communicator 35 of the subject vehicle 2a.

In the embodiment in particular, the communication performance index to determine the reference value is limited to the communication performance index received from the periphery vehicle 2b whose altitude difference from the subject vehicle 2a is within in the approximate altitude range (S14 through S17). The reference value can be determined exclusively based on communication performance indexes received from the periphery vehicle 2b whose communication environment is similar. It is therefore particularly possible to accurately distinguish between the case where the Bluetooth communicator 34 or the NFC communicator 35 of the subject vehicle 2a or the periphery vehicle 2b is abnormal and the case where the communication performance index for the Bluetooth communicator 34 or the NFC communicator 35 shows an abnormal value due to an influence of the communication environment.

When the Bluetooth communicator 34 or the NFC communicator 35 is determined to be abnormal (S25, S29), the embodiment uses the wide area communicator 32 to notify the center 5 of the vehicle ID assigned to the vehicle 2 mounted with the Bluetooth communicator 34 or the NFC communicator 35 determined to be abnormal, along with a message signifying that the Bluetooth communicator 34 or the NFC communicator 35 is abnormal. The center 5 can thereby recognize that an in-vehicle communication service using the Bluetooth communicator 34 or the NFC communicator 35 cannot be provided because the Bluetooth communicator 34 or the NFC communicator 35 is abnormal. It is possible to take measures to temporarily stop the in-vehicle communication service using the Bluetooth communicator 34 or the NFC communicator 35.

While the embodiment has been illustrated, the embodiment is not limited to the above-mentioned and can be modified in various ways. For example, the modifications described below are embodiments. The description below includes an element assigned the same reference numeral as that used hitherto. Except as otherwise noted, such element equals the element that is assigned the same reference numeral and is described in the above-mentioned embodiment. A configuration may be described only partially. In such a case, the above-mentioned embodiment is applicable to the remaining part of the configuration.

First Modification

The above-mentioned embodiment determines an anomaly in the subject vehicle 2a and the periphery vehicle 2b, namely, in terms of the Bluetooth communicator 34 and the NFC communicator 35 of the subject vehicle 2a (S26, S27) and the Bluetooth communicator 34 and the NFC communicator 35 of the periphery vehicle 2b (S21 through S23). However, the embodiment may determine an anomaly in only one of the subject vehicle 2a and the periphery vehicle 2b in terms of the Bluetooth communicator 34 and the NFC communicator 35. The embodiment may determine an anomaly on only one of the Bluetooth communicator 34 and the NFC communicator 35 in any of the subject vehicle 2a and the periphery vehicle 2b.

Second Modification

In the above-mentioned embodiment, the subject vehicle 2a and the periphery vehicle 2b are mounted with the same in-vehicle device 3. The controller 37 of the in-vehicle device 3 therefore performs the information transmission process (FIG. 3), the information reception process (FIG. 4), and the anomaly determination process (FIG. 5) in the subject vehicle 2a and the periphery vehicle 2b alike. However, the subject vehicle 2a need not perform the information transmission process (FIG. 3) in order for the in-vehicle device 3 of the subject vehicle 2a to determine an anomaly on the Bluetooth communicator 34 or the NFC communicator 35 of the subject vehicle 2a and the periphery vehicle 2b. The periphery vehicle 2b need not perform the information reception process (FIG. 4) and the anomaly determination process (FIG. 5). The controller 37 of the in-vehicle device 3 in the subject vehicle 2a therefore need not perform the information transmission process (FIG. 3). The in-vehicle device 3 in the periphery vehicle 2b need not perform the information reception process (FIG. 4) and the anomaly determination process (FIG. 5).

Third Modification

The above-mentioned embodiment uses the narrow area communicator 31 to transmit the communication performance index, the current altitude, and the vehicle ID (S4). However, the wide area communicator 32 may be used to transmit the communication performance index and the others. In this case, the wide area communicator 32 transmits the current latitude and longitude in addition to the current altitude.

The wide area communicator 32 receives the communication performance index and the others when the wide area communicator 32 is used to transmit the communication performance index and the others. The wide area communicator 32 functions as a reception section. The wide area communicator 32 receives the communication performance index and the others from the vehicles 2 other than the periphery vehicle 2b when the wide area communicator 32 transmits and receives the communication performance index and the others. However, the communication performance index from the periphery vehicle 2b can be isolated from communication performance indexes received by the wide area communicator 32 based on the current position received along with the communication performance index and the current position of the subject vehicle 2a, and therefore, the wide area communicator 32 may transmit and receive the communication performance index.

Fourth Modification

The position detector 33 may include an acceleration sensor and a gyro sensor in addition to the GNSS receiver so as to be capable of autonomous navigation when an electromagnetic wave is unsatisfactorily received from a positioning satellite.

Fifth Modification

The narrow area communicator 31 may notify an anomaly to the center 5 (S25, S29) via the roadside device 4 when the narrow area communicator 31 can communicate with the roadside device 4. The narrow area communicator 31 may notify an anomaly to the center 5 via the roadside device 4 by waiting until successful communication between the narrow area communicator 31 and the roadside device 4. In the fifth modification, the narrow area communicator 31 corresponds to a predetermined communicator.

Sixth Modification

The above-mentioned embodiment allows the targeted narrow area communicator to represent all the Bluetooth communicators 34 and the NFC communicators 35 whose reference value generation set includes the communication performance index. The embodiment is not limited to this. The targeted narrow area communicator may represent a predetermined number of Bluetooth communicators 34 and NFC communicators 35 sequentially in an order from the one nearest to the subject vehicle 2a out of the Bluetooth communicators 34 and the NFC communicators 35 whose reference value generation set includes the communication performance index.

Seventh Modification

The controller 37 may include a function as a baseband section that processes baseband signals included in electromagnetic waves transmitted and received by the Bluetooth communicator 34. In this case, the controller 37 determines the BT communication performance index. The controller 37 may include a function as a baseband section that processes baseband signals included in electromagnetic waves transmitted and received by the NFC communicator 35. In this case, the controller 37 determines the NFC communication performance index.

Eighth Modification

The communication performance index need not be transmitted cyclically. The communication performance index may be transmitted at the time when the narrow area communicator 31 starts communication with the roadside device 4.

Ninth Modification

In the above-mentioned embodiment, the communication performance index corresponds to one of the RSSI, the average communication rate, the communication success rate, and the number of received error frames. The communication performance index may use two or more of these. In this case, the reference value is also determined for respective communication performance indexes. The reference value is also compared with the communication performance index to determine an anomaly for a respective communication performance index. The anomaly determination performed for respective communication performance indexes may result in a predetermined number of communication performance indexes that satisfy an anomaly determination condition. The Bluetooth communicator 34 or the NFC communicator 35 corresponding to the communication performance indexes is then determined to be abnormal.

What is claimed is:

1. A vehicular communication device used for a vehicle, comprising:
    a reception section that receives, from a periphery vehicle equipped with a narrow area communicator for performing vehicle interior communication, a communication performance index representing performance of the narrow area communicator;
    a reference value setup section that successively sets a reference value as a criterion for the communication performance index, based on the communication performance indexes received by the reception section from a plurality of the periphery vehicles;
    an acquisition section that acquires the communication performance index for a targeted narrow area communicator, the targeted narrow area communicator being the narrow area communicator that is targeted at anomaly determination; and
    an anomaly determination section that determines anomaly of the targeted narrow area communicator, based on comparison between the reference value set by the reference value setup section and the communication performance index acquired by the acquisition section for the targeted narrow area communicator.

2. The vehicular communication device according to claim 1, wherein:
    the acquisition section acquires any one of the communication performance indexes received by the reception section from the plurality of periphery vehicles as the communication performance index for the targeted narrow area communicator.

3. The vehicular communication device according to claim 2, further comprising:
    a first anomaly notification processing section that, when the targeted narrow area communicator is determined to be abnormal by the anomaly determination section, uses a specified communicator to notify a center that the narrow area communicator of the periphery vehicle, as the targeted narrow area communicator, is abnormal.

4. The vehicular communication device according to claim 1, wherein:
    the vehicular communication device includes a narrow area communicator; and
    the acquisition section acquires, as the communication performance index for the targeted narrow area communicator, the communication performance index for the narrow area communicator that is included in the same vehicular communication device as the acquisition section is included.

5. The vehicular communication device according to claim 4, further comprising:
    a second anomaly notification processing section that, when the targeted narrow area communicator is determined to be abnormal by the anomaly determination section, uses a specified communicator to notify a center that the narrow area communicator of a subject vehicle is abnormal, the subject vehicle being the vehicle for which the targeted narrow area communicator is used.

6. The vehicular communication device according to claim 4, wherein
    the narrow area communicator reads payment information from a storage medium storing the payment information used to pay charge for the vehicle when using a road facility,
    the vehicular communication device further comprising:
    a wide area communicator that communicates with a center to perform a process concerning the charge via a communication network;
    a storage unit that is writable;
    a storage control section that, when the narrow area communicator reads the payment information, stores the read payment information in the storage unit; and
    a transmission control section that causes the wide area communicator to transmit the payment information read by the narrow area communicator to the center, wherein
    when, after the storage control section stores the payment information in the storage unit, the anomaly determination section determines anomaly of the narrow area communicator until ignition-off and there arise needs to read the payment information, the transmission control section transmits the payment information stored in the storage unit to the center instead of the payment information read by the narrow area communicator.

7. The vehicular communication device according to claim 1, wherein:
    the reception section receives the communication performance index and an altitude of the periphery vehicle transmitting the communication performance index;
    the vehicular communication device further comprises an altitude detector to detect an altitude of a subject vehicle, the subject vehicle being the vehicle for which the vehicular communication device is used; and
    the reference value setup section successively sets the reference value by using, out of the communication performance indexes acquired along with the altitudes by the reception section from the plurality of periphery vehicles, the communication performance index received along with the altitude whose difference from the altitude of the subject vehicle detected by the altitude detector is within an approximate altitude range.

8. A vehicular communication device used for a vehicle, comprising:
    a wide area communicator that receives, from a periphery vehicle equipped with a narrow area communicator for performing vehicle interior communication, a communication performance index representing performance of the narrow area communicator; and a controller having a processor and memory configured to:
    successively set a reference value as a criterion for the communication performance index, based on communication performance indexes received by the wide area communicator from a plurality of periphery vehicles;
    acquire the communication performance index for a targeted narrow area communicator, the targeted narrow area communicator being the narrow area communicator that is targeted for anomaly determination; and
    determine an anomaly of the targeted narrow area communicator, based on comparison between the set reference value and the acquired communication performance index for the targeted narrow area communicator.

\* \* \* \* \*